United States Patent [19]

Stevenson

[11] Patent Number: 4,909,118

[45] Date of Patent: Mar. 20, 1990

[54] REAL TIME DIGITAL ADDITIVE SYNTHESIZER

[76] Inventor: John D. Stevenson, Rte. #1, Box 9C, Elizabeth, Ark. 72531

[21] Appl. No.: 275,932

[22] Filed: Nov. 25, 1988

[51] Int. Cl.[4] ........................ G01H 1/08; G01H 7/00

[52] U.S. Cl. ........................................ 84/622; 84/659

[58] Field of Search ...................... 84/1.01, 1.11–1.13, 84/1.19–1.23

[56] References Cited

U.S. PATENT DOCUMENTS

| | | | |
|---|---|---|---|
| 3,908,504 | 9/1975 | Deutsch | 84/1.19 |
| 4,150,600 | 4/1979 | Deutsch | 84/1.11 |
| 4,300,432 | 11/1981 | Deutsch | 84/1.01 |
| 4,300,434 | 11/1981 | Deutsch | 84/1.19 |
| 4,471,681 | 9/1984 | Nishimoto | 84/1.23 |
| 4,638,709 | 1/1987 | Nagashima et al. | 84/1.19 |
| 4,700,603 | 10/1987 | Takauji et al. | 84/1.19 |
| 4,735,123 | 4/1988 | Deutsch | 84/1.19 |
| 4,800,794 | 1/1989 | Deutsch | 84/1.21 |

*Primary Examiner*—Stanley J. Witkowski

*Attorney, Agent, or Firm*—Polster, Polster and Lucchesi

[57] ABSTRACT

A digital synthesizer includes an input transducer for accepting input signals from a musician representing at least the desired fundamental pitch and timbre. The synthesizer has timbre storing circuitry for storing data representing a plurality of selectable timbres, including relative pitch data for a plurality of sets of partials and a plurality of sets of amplitude data, the partials and the amplitudes being independently selectable. Waveform determining circuitry determines sequential values of the musical waveform in real time from the timbre data, from the timbre selected by the musician, and from the pitch selected by the musician. The waveform determining circuitry includes a first adder for additively determining the phase of each partial of the selected timbre and is responsive to the relative partial pitch data to determine that phase. It also includes a second adder for summing the magnitudes of all the partials for the selected timbre at each predetermined time interval to generate the magnitude of the musical waveform at that instant.

20 Claims, 2 Drawing Sheets

REAL TIME DIGITAL ADDITIVE SYNTHESIZER

BACKGROUND OF THE INVENTION

This invention relates to electronic musical instruments and more particularly to such instruments of the digital synthesizer type in which the output waveform is computed from a plurality of component waveforms.

For purposes of this application, the following terms shall have the following meanings unless otherwise noted:

VOICE: a complex waveform consisting of pitched and unpitched components and including its amplitude envelope.

ADSR: attack-decay-sustain-release—the envelope amplitude waveform containing the voice.

TIMBRE: the portion of a voice consisting of pitched components only. Sometimes this term is used to include unpitched components also. In no case does it include the amplitude envelope.

PITCH: a term used synonymously with frequency.

FUNDAMENTAL: the pitched component with the lowest pitch. Note that the amplitude of a fundamental can be zero and still be valid. If sufficient overtones exist to establish the fundamental, it will be apparent even if it does not exist.

OVERTONE: a pitched component of higher frequency than the fundamental. Harmonics are a subset of overtones. The fundamental is not an overtone.

HARMONIC: a pitched component of higher frequency than the fundamental which also has an integral relationship in pitch with the fundamental. Since it is the reference by which harmonics are defined, the fundamental is not strictly a harmonic; yet, when included with harmonics as a set the fundamental is often referred to as the first harmonic.

PARTIAL: any pitched or unpitched component part of a voice.

FRACTIONAL: a new term connoting an overtone with a simple fractional relationship with the fundamental such as ½, ⅓, ¼, etc.

It is well-known that pleasing musical sounds can ee generated electronically by building a complex pitched waveform as the sum of a fundamental wave (a fundamental pitch sine waveform) and selected harmonic overtones (sine waveforms with frequencies which are integral multiples of the frequencies of the fundamental). An electronic musical instrument of this type is disclosed, for example, in U.S. Pat. No. 3,809,786 to Deutsch.

Timbres or musical sounds produced in this way typically have complex waveforms which are fixed in shape from cycle to cycle. An advantage resulting from this characteristic is that a single cycle of the waveform may be placed in a memory and played back by traversing the memory at a desired fundamental pitch rate. An electronic musical instrument of this type is disclosed, for example, in U.S. Pat. No. 4,601,229 to Deutsch.

Although many timbre variations may be produced in this type system by varying the amplitude coefficients, the sound produced in this way is considered bland and uninteresting by listeners. In part this is due to the fact that sounds generated by mechanical musical instruments differ significantly from the sound generated by this type of digital system. For example, mechanical musical instruments generate overtones which have small variations inpitch from a true harmonic (i.e., integral) relationship with the fundamental. That is, the overtones of mechanical musical instruments are detuned somewhat. Since music listeners have become accustomed to such variations, they strongly prefer musical instruments that exhibit such overtone detuning.

Due to the constantly shifting phase relationships between the components of the complex waveform, pitched complex waveforms with detuned overtones are not uniform in shape from cycle to cycle. Consequently, they may not be placed in a memory for traversing playback unless a very large memory, capable of containing several seconds of music, is used. Such memories would be prohibitive in size, especially if a multiplicity of voices are to be contained for immediate playback. Therefore, a voice with detuned overtones must be generated in real time.

Several schemes have been devised for obtaining detuned overtones for real time playback. A scheme with limited abilities and very complex hardware requirements is shown in U.S. Pat. No. 4,513,651 to Deutsch This scheme provides three sets of partial amplitude coefficients (with consequent hardware triplication), which are mutually exclusive with respect to zero amplitudes. Each set of partial amplitude coefficients are utilized with a pitch slightly different from the other, summed to form the composite waveform. The three sets provide deviation for sets of partials, but do not allow individual pitch adjustment.

Another scheme, elegant in concept but overly complex in hardware requirements, is disclosed in U.S. Pat. No. 4,215,614 to Chibana. This scheme provides detuning coefficients and pitch coefficients in a logarithmic scale. When summed these coefficients are processed through a logarithmic to linear converter to provide a good substitute for the multiplication operation otherwise required. This patent also suggests that of the pitch variations such as vibrato, portamento and glide could be incorporated. This would be uneconomical, however, since these functions are quite slow in nature and can be handled more flexibly and cheaply by software in a controlling processor.

In addition to the overtone detuning mentioned above, mechanical musical instruments exhibit changes in overtone structure during the course of a single note. Some of these changes are associate with envelope amplitude and others with time. The overtone structure for the guitar, for example, is quite different at the half-amplitude point from that at its peak amplitude. These changes in overtone structure occur in both the overtone amplitude and overtone pitch.

Mechanical musical instruments also exhibit changes in overtone structure as a result of playing style. For example, the overtone structure of the clarinet played softly is not the same as the overtone structure when it is played loudly.

Modern music listeners have become accustomed to musical instruments which exhibit these overtone structure changes. Contemporary guitar musicians use many devices to adjust voice timbre during a rendition. And modern keyboard devices exhibit many timbre adjustment facilities.

another challenge which faces the designer of electronic musical instruments is that t would be advantageous if a musical instrument could contain a multiplicity of voices such that an instantaneous selection could be made by switch, either by exclusive selection or by sequential selection.

An effort to meet a small portion of these challenges has been proposed by Yoichi Nagashima et al in U.S. Pat. No. 4,612,838, issued Sept. 23, 1986. In that patent he proposes developing two voice structures, with differing amplitude coefficients, and interpolating between the two in order to obtain voices with intermediate overtone structure. The hardware complexity and computation time required for this interpolation scheme detracts from its usefulness. The limitations imposed by having only two sets of coefficients (even though intermediate points serve as other sets) is also undesirable. The Nagashima invention covers only overtone amplitude adjustments and does not address the overtone pitch adjustment problem.

Heretofore, designers of electronic musical instruments have been trying to "catch up with nature," i.e., trying to produce voices synthetically which have the listening appeal of mechanical musical instruments. Indeed, much effort has been expended in attempting to duplicate the sound of existing mechanical musical instruments.

This narrow approach to music synthesis has resulted in a dedication to producing voices composed of a fundamental plus integer or near integer related overtones (in which the overtones are full multiples or nearful multiples of the fundamental). It has been discovered, however, that in actual fact very pleasant voices may be constructed from a fundamental plus overtones that are multiples of one-half (or nearly so) of the fundamental. Such voices do not appear in any mechanical musical instrument. Other "fractional harmonics" such as one-third, one-fourth, etc. may be used to either construct voices or to augment the tonal qualities of more conventionally constructed voices, but the prior at appears to be unaware of this fact.

Another area of voice augmentation that has been overlooked in prior art electronic musical instruments is in providing a capability for a multiplicity of a particular partial. It has been assumed that since only one of each of a given set of partials appears in mechanical musical instruments, then only one is needed. It has been discovered, however, that a particularly striking augmentation of a voice may be realized by selecting one of the component partials and triplicating it, tuning one to the pure pitch ratio while tuning another flat and another sharp. The result (with small amounts of such detuning) is a singular voice with a choral overtone. An endless number of variations to this theme are available; for example, more than one partial may be so constructed with the second set tuned various degrees of sharp or flat, perhaps another set may be developed, detuned in the opposite direction. All of these vaiations, if properly designed, are interesting, unique and melodic voices with musical characteristics not available in any mechanical device.

Another defect in current schemes for voice construction arises from hardware that produces a component for the voice whether needed or not, even if it has a zero amplitude coefficient. In these prior art schemes, each possible component to be used in voice construction is assigned a time slot during computation and that time slot is used for the computation of that voice element, whether that component is present or not. A much more flexible scheme, disclosed in the present invention, would allow independent component assignment to the time slots.

Most voices have zero amplitude coefficients for some (or most) of the available partial components. If these time slots were free for reassignment, then the voices could be further augmented with multiple overtones or selected fractional partials. In fact, if a voice required only a few partials, the entire voice could be replicated. If the replicated voice were tuned properly, this would result in a choral effect, without the complication of adding further hardware.

SUMMARY OF THE INVENTION

It is therefore an object of this invention to provide an electronic musical instrument which is free from the above listed shortcomings and defects of the prior art, which is economical in construction and which provides flexibility in operation and function.

Another object of this invention is to provide a musical instrument which will produce a voice overtone structure in which each overtone is individually controllable in both pitch and amplitude.

Still another object of this invention is to provide a musical instrument which contains, at all times, a multiplicity of voice overtone structures, under executive control, such that instantaneous voice selection may be made in response to time, envelope waveform or musician demands.

Yet another object of this invention is to provide a hardware structure with a flexibility which allows individual assignment of each computation time period to any voice overtone component desired, including replication of any such component; such flexibility allowing the omission of any component with a zero amplitude coefficient.

Still another object of this invention is to provide a unique method of overtone production which eliminates, at the least, one multiplication now in state of the art mechanisms and provides a design concept more in harmony with the human concept of voice design.

Other objects and features will be in part apparent and in part pointed out hereinafter.

Briefly, an electronic musical instrument of the present invention includes an input interface for accepting input signals from a musician, which input signals specify musical parameters including the fundamental pitch and the timbre desired by the musician. Timbre storing circuitry stores data representing a plurality of selectable timbres. The timbre storing circuitry includes relative partial pitch storing circuitry for storing a plurality of sets of relative partial pitch data, each set of data representing the relative pitches for a plurality of partials defined for that set. The timbre storing circuitry also includes partial amplitude storing circuitry for storing a plurality of sets of partial amplitude data, each set representing the maximum amplitudes for the individual partials of any one of the sets of partials. The instrument also includes waveform determining circuitry for determining sequential values of the musical waveform in real time from the timbre data, from the timbre selected by the musician, and from the pitch selected by the musician. The sequential values are spaced apart by a predetermined time interval. The waveform determining circuitry includes a first adder for additively determining the phase of each partial of the selected timbre, which first adder is responsive to the relative partial pitch storing circuitry to determine the phase of that partial. A second adder sums the magnitudes of all the partials for the selected timbre at each predetermined time interval to generate the magnitude of the musical waveform at that instant.

BRIEF DESCRIPTION OF THE DRAWINGS

Similar reference characters indicate similar parts throughout the several views of the drawings.

DESCRIPTION OF THE PREFERRED EMBODIMENT

Electronic musical instruments of the digital synthesizing type use the Fourier model for synthesizing the desired waveforms. In the Fourier model, $$F(s) = \sum_{n=1}^{c} A(n) * \sin(2\pi ns/S)$$

where:

F(s)—a value of sample s s—a particular sample

S—number of samples in one fundamental waveform c—number of harmonics used in the construction n—a harmonic integer multiple A(n)—amplitude coefficient corresponding to harmonic n This model defines a fixed timbre waveform composed of harmonics which are integral multiples of the fundamental, which is only a limited subset of the timbres actually required.

A more general model, and one which more closely describes the full requirements of satisfactory digital synthesizer, allows timbres that:

(1) are composed of integer and or non-integer overtones, (2) may have multiple identical or near identical partials, and (3) provides for variation in both the amplitude and pitch of each partial.

This more general model is incorporated into the present invention. To meet the requirements of (1) and (2), the pitch of a partial must be separated from the arithmetic element which produces that partial. For example, a hypothetical arithmetic element 12 cannot be required to be the twelfth harmonic. To allow this flexibility, a set of pitch coefficients must be provided for each timbre, in the same number as the number of partials to be used in the timbre construction (also in the same number as the number of amplitude coefficients in a timbre set).

To meet the requirements of (3), two matrices are required, both containing multiple sets of coefficients. The two matrices are of identical size, A(r,c) and P(r,c) where c is the number of partials to be used in the timbres to be produced and r is the number of individual voice timbres to be loaded prior to the musician play function. The A matrix contains partial amplitude coefficients, each of which is in the range $0 <= A <= 1$. The P matrix contains partial pitch coefficients, with values $1 <= P$. Timbres are changed by traversing and or selecting corresponding sets of amplitude and pitch coefficients.

This more general model is represented mathematically as:

$$F(s,v) = \sum_{n=1}^{c} A(v,n) * \sin(P(v,n) * 2\pi s/S)$$

where:

F(s,v)—sample value for a particular timbre c—the number of partials used in the construction n—a particular partial within a timber v—a particular timbre set.

By way of illustration, if the value of P(v,n)=

1 the fundamental is generated, 2 the second harmonic is generated, 1.5 the second fractional of the ½ fractional series is generated, 4.1 the 4th harmonic tuned sharp 2.5% is generated, 3.9 the 4th harmonic tuned flat 2.5% is generated.

Figure 1:
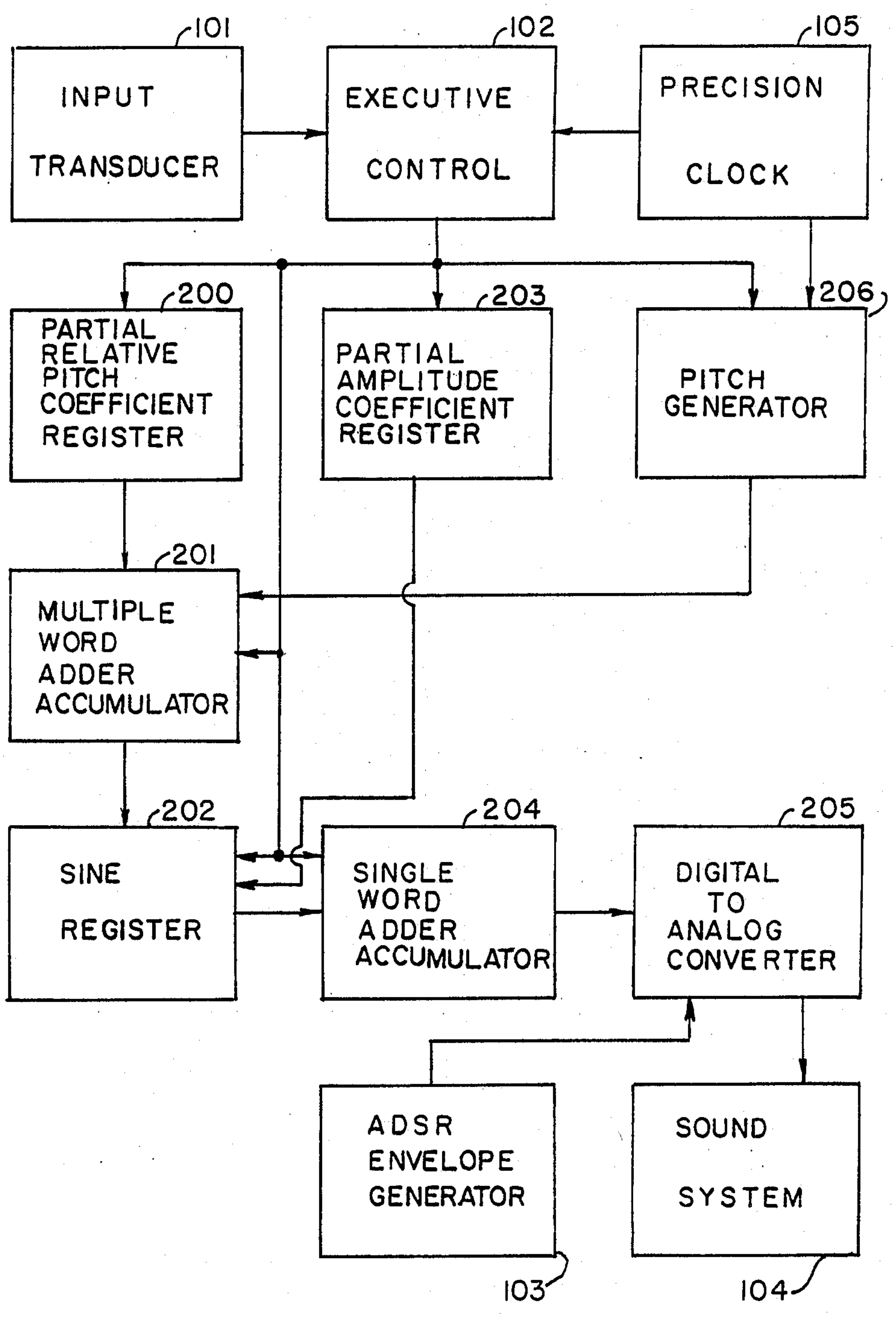
FIG. 1 is a schematic lock diagram of the preferred embodiment of the present invention.

FIG. 1 illustrates the electronic musical instrument of the present invention which incorporates this more general model. The synthesizer, herein described, produces a complex musical waveform by calculating the instantaneous value of the waveform, in a sequential fashion, at a rate which is a large integer multiple of the resultant waveform pitch. For music of high quality, typical multiples may be as small as thirty-two for very high pitches, to as large as 1024 for very low pitches.

Such voices are first designed to provide the desired timbre through specifying the number of partials to be used in its construction and the pitch and amplitude of each of those partials. The synthesizer provides for the maximum number of partials which may be required to properly define the voices which it is required to produce. A typical number of such partials might be thirty-two. The instantaneous value of each partial used is calculated and all resultant values summed to obtain the composite waveform value.

To perform these calculations in a parallel fashion, such that all partial values are obtained simultaneously, would be prohibitive in hardware complexity, since many identical hardware circuit sets would be required. It is much more economical to use one calculation circuit and to perform this calculation sequentially—first one partial, then the next, until the entire set has been computed. To this end, a number of time slots (computation channels) equal to the maximum number of expected partials are established, thereby multiplexing the computation of the partials through the same computation circuit.

Prior to calculation, the specification for the voice to be produced must be loaded into the synthesizer.

An input transducer 101 is provided for obtaining musical information from a keyboard, stringed instrument, horn or any other construction which allows the musician to express his desires, in signal form, for a musical sound with particular characteristics. Signals designating the desired pitch and envelope amplitude, as a minimum, may be augmented by signals expressing the musicians need for voice timbre modification, tremolo, vibrato, etc. All such signals, even those developed as analog voltages, must be in digital word format when transferred to an executive control circuit 102.

Executive control circuit 102, composed of conventional control circuitry (which in the preferred embodiment includes a microprocessor), receives the signals from input transducer 101 and provides pitch, amplitude and other digital controlling and timing signals to the synthesizer. This circuit also includes provision for loading pitch and amplitude coefficients into their respective registers within the synthesizer prior to the play mode.

A crystal oscillator provides a precision clock 105 for controlling computation functions and pitch generation.

A partial relative pitch coefficient register 200 provides storage for a multiplicity of sets of relative pitch coefficients. One relative pitch coefficient is required for each computation channel or time slot. A typical embodiment provides for thirty-two such cannels, thereby requiring thirty-two relative pitch coefficients per voice set. When the synthesizer is computing one waveform value, the executive control circuit 102 provides addressing to register 200 to provide the pitch coefficients n sequence to a multiple word adder accumulator 201. In order to have a multiplicity of voices available for instant play (a typical number would be sixty-four), multiple sets of these coefficients are provided in the partial relative pitch coefficient register 200. The loading of coefficients into register 200 is performed by executive control circuit 102 during a load mode and prior to the musician's performance.

Multiple word adder accumulator 201 provides modulo summation of the terms presented from the partial relative pitch coefficient register 200, by sequentially adding the relative pitch coefficient, corresponding to a given computation channel, to the accumulating word for that same channel. (It performs this function on the entire set of coefficients once for each clock signal generated by the pitch generator 206). Each such channel accumulated word then supplies table traversing address data to a sine register 202. A more detailed description of this accumulator 201 is provided in the discussion on FIG. 3 below.

The clock signal produced by the pitch generator 206 is the desired pitch of the output composite waveform to be provided to a sound system 104 (such as a conventional loudspeaker, amplifier, etc.) by a digital to analog converter 205, but at a much higher octave. The frequency of this clock is C/P where C is the master clock frequency from the precision clock 105 and P is the digital pitch word from executive control circuit 102. Typically this octave would be in the 40 to 80 kilohertz range. This clock supplies the sampling rate of the output signal—a point on that waveform is calculated with each clock pulse from pitch generator 206.

The most significant bit of a particular modulo word in multiple word adder accumulator 201 has a frequency of $(C/P)\times(R/M)$, where R is the relative pitch coefficient for that computation time slot and M is the maximum count possible in the modulo word. If the value of the pitch coefficient was 512 and the modulo word was 16 bits wide (maximum count=65536), then the most significant bit frequency would be $(C/P)/128$. A pitch coefficient of 1024 would supply the integer related second harmonic, a coefficient of 1040 would supply a second harmonic that has been detuned sharp. The most significant bits (nine bits if the sine tables contain 512 values) form the table inquiry address lines to the sine tables in sine register 202.

A significant advantage of this construction is that the assignment of partials is not restricted in order and duplication of partials is possible. Each computation time slot is independent with respect to its relative frequency.

Since the frequency provided by pitch generator 206 is usually restricted in range to one octave, a given set of relative pitch coefficients will provide a partial set for only one octave. Since a shift of these coefficients right or left will produce the next octave lower or higher, then multiple octaves may ee obtained by either providing multiple sets of coefficients in the relative pitch coefficient register or by shifting the coefficients. In either case control can be by response to an octave signal provided by the executive control circuit 102.

Sine register 202 provides partial sine data in response to the addressing from multiple word adder accumulator 201 and the artial level data from partial amplitude coefficient register 203. This sine register is a read only memory containing multiple sine tables, each typically consisting of 512 values. In order to avoid a multiplication, the sinetables are entered in scaled values. The proper table is selected by the amplitude coefficient from the partial amplitude coefficient register 203.

In order to obtain a larger dynamic range for a given number of sine tables, the sine tables in line register 202 are scaled in decibels rather than in a linear scale. In addition to providing a much expanded range, this scaling is more in keeping with the auditory response of the human ear. Since the human ear does not perceive a step change in sound volume of two decibels as a step, there is no need for precision much greater than that in the sine tables. A sound (such as a particular partial) buried in a volume of sound (such as the sum of the balance of partials in the timbre) will, in general, be lost if it is much below −45 decibels in amplitude. A sine table need not provide for levels much lower than that. As an example a sine register utilizing 512 entry sine tables, one decibel step difference between tables, and a 63 decibel range between the strongest and weakest table (one table must be reserved for zero amplitude) and with 16 bit precision, may be implemented by two inexpensive 27256 (32k×8) EPROM (electronically programmable read only memory) packages. The partial amplitude coefficient is, as a result, an amplitude specification in decibels.

Partial amplitude coefficient register 203 is provided to contain the partial amplitude specifications. A set of amplitude coefficients consists of one for each computation channel. Multiple sets of amplitude coefficients are contained in this register, each set corresponding with one of the multiple partial pitch coefficient sets contained in the relative pitch coefficient register 200, thereby providing both partial pitch and amplitude control for multiple voices.

Before a computation cycle, a single word adder accumulator 204 is cleared to zero. As each adjusted sine value is received from the sine register 202 during each computation slot time period, it is summed into the single word adder accumulator 204 word at the end of that time slot. A more detailed description of single word adder accumulator 204 is given in a following paragraph describing FIG. 2.

When the computation cycle is completed, the word from single word adder accumulator 204 containing the sum total of all of the computation time slots within that computation cycle is latched into the digital to analog converter (DAC) 205. This DAC is a multiplying type provided with an analog amplitude value from the ADSR envelope generator 103. The analog product of the two signals becomes the music output to a sound system 104.

The clock signal from precision clock 105 (typically near 24 MHz) is provided to pitch generator 206. The pitch generator 206 is a programmable counter whose output frequency is the quotient resulting from the clock frequency being divided by the pitch number supplied by executive control circuit 102. The output frequency is an integral multiple of the desired musical pitch.

Figure 2:
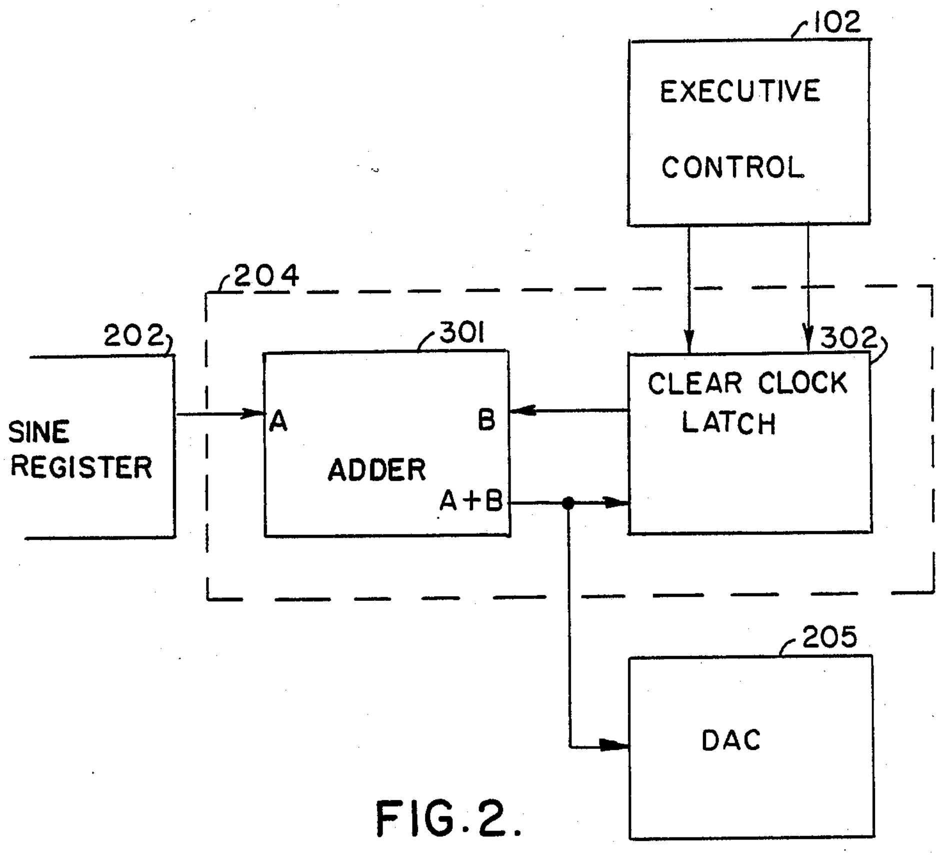
FIG. 2 is a more detailed schematic block diagram of a single word adder accumulator, shown as item 204 in FIG. 1.

FIG. 2 shows an expanded schematic of single word adder accumulator 204. This accumulator consists of an adder 301 and a latch 302. The adder is wired with end around carry in order to sum both negative and positive input numbers. Data is received from sine register 202 on the A input terminals of adder 301. Data is receive from latch 302 on the B terminals of adder 301. The resultant sum A+B on the sum terminals of adder 301 is placed on the input terminals of latch 302 and also serves as the output accumulated word to be latched into DAC 205.

Prior to a computation cycle, executive control circuit 102 places a clear signal on the clear terminal of latch 302. During the first time slot (computation channel), the adjusted sine value for the partial being calculated in that slot appears on the A terminals of adder 301. Since latch 302 has been cleared, zero then appears on the B terminals of adder 301, resulting in an output word equal to the value on the A terminals. At the end of this time slot executive control circuit 102 provides a clock signal to latch 302, thereby clocking the value on its input terminals to its output terminals.

During the second time slot, the adjusted sine value for the partial being calculated in that slot appears on the A terminals of adder 301. The output terminals of latch 302 place the value just previously latched on the B terminals of adder 301. The sum terminals of adder 301 now contain the sum of the adjusted sine values for the first two time slots. At the end of this time slot, latch 302 is again clocked.

In a like manner, during the third time slot, the sum of the adjusted sine values for the first three slots appears on the sum terminals of adder 301. Duing the last time slot of the computation cycle, the sum of the adjusted sine values for all of the time slots appears on the sum terminals of adder 301. This, then, is the value latched into DAC 205.

Figure 3:
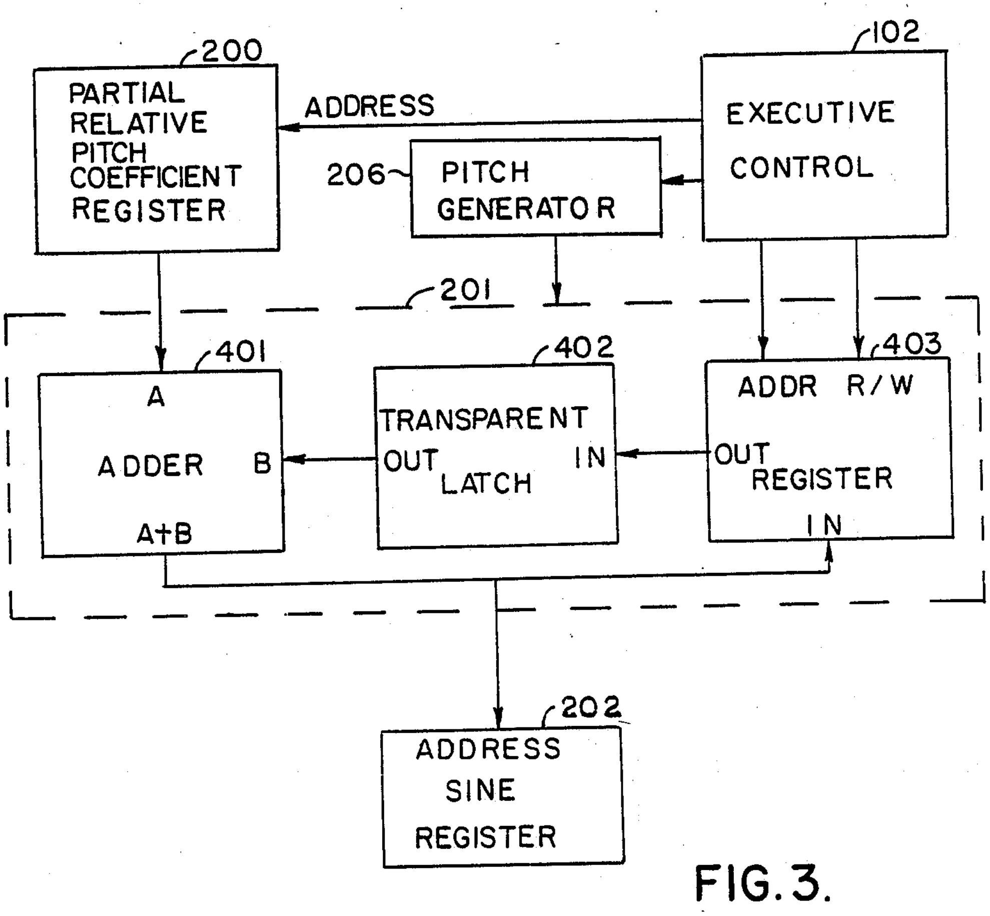
FIG. 3 is a more detailed schematic block diagram of a multiple word adder accumulator, shown as item 201 in FIG. 1.

FIG. 3 shows an expanded schematic of the multiple word adder accumulator. Multiple word adder accumulator 201 performs its function in the same manner as an adder accumulator except that, as its name implies, it accumulates multiple word sums instead of a single one. In the case of this multiple word adder accumulator 201, a word is accumulated for each time slot (computation channel) in the computation cycle (typically thirty-two, although the mechanism will work for any number). Unlike adder accumulator 204, multiple word adder accumulator 201 is not cleared at the start of each computation cycle but carries the sum forward to the next computation cycle. Also, unlike adder accumulator 204, which sums the complete set of computation channel results into one sum, multiple word adder accumulator 201 sums only the repeated addition of the partial pitch coefficient from the coefficient register 200 for each computation channel into a sum word for that same computation channel.

The data output terminals of partial relative pitch coefficient register 200 are connected to the A input terminals of an adder 401. During a computation cycle, the relative pitch coefficients for the partial being calculated in each computation channel are sequentially applied to adder 401.

The output terminals of a transparent latch 402 are applied to the B terminals of the adder 401. A transparent latch has the property of being transparent (the values on its input terminals appear on its output terminals) when the signal on its clock pin is low. In that mode it acts as a positive logic buffer. When the clock pin is raised high, the data on the input pins at the time of the leading edge are latched to the output pins and as long as the clock pin remains high the output data are constant and unchanging even though the data on the input pins change.

The data output pins of a register 403 (typically a static random access memory) are connected to the input pins of transparent latch 402. The A+B sum output pins of adder 401 provide the desired sine table address signal to sine register 202 and the signal on these pins is also applied to the input data pins of register 401. Since only additions are performed and the output desired is of modulo format, the adder is not connected end around carry. The same addressing that is use on register 200 is also applied to register 403 so that for each computation channel a particular relative pitch coefficient is supplied by register 200 to adder 401 and a corresponding register word is supplied by register 403 through the transparent latch 402 to adder 401.

During the first half of each partial computation time slot, the clock pin on transparent latch 402 is low and the read write pin on register 403 is in the read condition. The data in register 403 for that particular time slot is applied through transparent latch 402 (now in the transparent or buffer mode) to the B input data pins of the adder 401. At this same time, the relative pitch coefficient for that partial is produced by relative pitch coefficient register 200 and placed thereby on the A input pins of adder 401. The A+B sum from adder 401 is placed nn the input pins of register 403, but has no effect during this half cycle since the register 403 is in the read mode and ignores signals on its input pins.

At the end of the first half of each partial computation time slot, the clock pin of transparent latch 402 is brought high, thereby locking the data on its output terminals to the value on its input terminals. During the second half of each partial computation time slot, the clock pin on transparent latch 402 is high and the latch remains in latched condition. During this period the A+B sum remains the same and is still presented to the input pins of register 403. Toward the end of this period, after all signals have time to settle and become stable, a write signal is applied to register 403, causing the sum A+B to be written into the same register location that contained only B before.

Each time that same partial computation time slot is serviced, the register word in register 403, which corresponds to that time slot, accumulates the sum of its prior value plus the corresponding value of the relative pitch coefficient from relative pitch coefficient register 200.

In view of the above it will be seen that the various objects and features of the present invention are achieved and other advantageous results obtained.

As various changes could be made in the above systems without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An electronic musical instrument of the type that digitally synthesizes a musical waveform, said instrument comprising:

input signal accepting means for accepting input signals from a musician, said input signals specifying musical parameters including the fundamental pitch and the timbre desired by the musician;

timbre storing means for storing data representing a plurality of selectable timbres, said timbre storing means including relative partial pitch storing means for storing a plurality of sets of relative partial pitch data, each set representing the relative pitches for a plurality of partials defined for that set, said timbre storing means also including partial amplitude storing means for storing a plurality of sets of partial amplitude data, each set representing the maximum amplitudes for the individual partials of any one of said sets of partials; and waveform determining means for determining sequential value of the musical waveform in real time from the timbre data, from the input signal specifying the timbre selected by the musician, and from the input signal specifying the pitch selected by the musician, said timbre data from which the waveform determining means determines sequential values of the musical waveform including a set of the relative partial pitch data corresponding to the timbre specified by the timbre input signal and a set of the partial amplitude data corresponding to the timbre specified by the timbre input signal, said sets of relative partial pitch data and partial amplitude data being obtained from the relative partial pitch storing means and the partial amplitude storing means respectively, said sequential values being spaced apart by a predetermined time interval, said waveform determining means including first adder means for additively determining the phase of each partial of the selected timbre, said first adder means being responsive to the relative partial pitch storing means to determine said phase, and second adder means for summing the magnitudes of all the partials for the selected timbre at each predetermined time interval to generate the magnitude of the musical waveform at that instant.

2. The musical instrument as set forth in claim 1 wherein the first adder means includes means for sequentially determining the phase of each partial in the selected timbre by adding the relative partial pitch data for that partial to any preexisting sum for that particular partial and temporarily storing the resulting sum for each partial for use in the determining the phase of each partial during the next predetermined time interval.

3. The musical instrument as set forth in claim 2 wherein the first adder means is a modulo adder with the modulus selected such that only the phase information for that partial is retained after calculation of the sum for a particular partial.

4. The musical instrument as set forth in claim 2 wherein the waveform determining means includes memory means for storing a plurality of sets of sine values corresponding to the phases of the partials, said memory means being connected to and responsive to the first adder means to select or each partial a sine value from the memory means corresponding to the sum from the adder means for that particular partial.

5. The musical instrument as set forth in claim 4 wherein the contents of the memory means is accessed by means of memory location address signals, the sum from the first adder means for each partial forming part of the address signal for the corresponding sine value.

6. The musical instrument as set forth in claim 5 wherein he partial amplitude storing means is also connected to the memory means and data from said partial amplitude storing means as forms part of the address signal for the corresponding sine value.

7. The musical instrument as set forth in claim 6 wherein the memory means includes a plurality of sets of sine values, said sets of sine values being scaled with respect to each other so that different sets of sine values represent different maximum amplitude values, said partial amplitude storing means being connected to the memory means so as to select a set of sine values corresponding to the data supplied from the partial amplitude storing means and said first adder means being connected to the memory means so as to select the particular value from corresponding set of sine values which is associated with the phase represented by the sum of the first adder means.

8. The musical instrument as set forth in claim 7 wherein the sets of sine values are scaled with a log relationship, the corresponding sine values of adjacent sets differing by at least one decibel.

9. The musical instrument as set forth in claim 4 wherein the output of the memory means is connected to the second adder means, said memory means being responsive to the first adder means to supply a set of values to the second adder means during the predetermined time interval, said second adder means being responsive to said memory means to add the particular values of the set of values together to determine the magnitude of the musical waveform for that particular predetermined time interval.

10. The musical instrument as set forth in claim 9 wherein the second adder means includes means for clearing said second adder means at the end of each predetermined time interval before computation of the value of the musical waveform for the next predetermined time interval is begun by said second adder means.

11. The musical instrument as set forth in claim 9 further including a digital to analog converter connected to the output of the second adder means for converting the magnitude values from the second adder means into an analog signal suitable for a loudspeaker.

12. The musical instrument as set forth in claim 11 further including means connected to the digital to analog converter and responsive t input signal accepting means for controlling the absolute amplitude of the output analog signal in response to the desired absolute amplitude selected by the musician.

13. The musical instrument as set forth in claim 2 wherein the first adder means has means for temporarily storing a plurality of words, each word corresponding to a particular partial in the selected timbre, and wherein the first adder means adds the relative partial pitch data for each partial to the value stored in the corresponding word sequentially.

14. The musical instrument as set forth in claim 1 wherein the timbre storing means includes data for a particular timbre with a set of partials having approximately the same frequency, at least one of said partials of said set being slightly flat with respect to another of said partials of said set.

15. The musical instrument as set forth in claim 1 wherein the timbre storing means includes data for a particular timbre which contains only second harmonics or above of the fundamental pitch selected by the musician.

16. The musical instrument as set fort in claim 1 wherein the timbre storing means includes data for a particular timbre which contains partials which are fractional overtones of the fundamental pitch selected by the musician.

17. The musical instrument as set forth in claim 1 wherein the data in the relative partial pitch storing means and the data in the partial amplitude storing means are both independently selectable by the musician so that any particular set of relative partial pitch data can be used with any particular set of partial amplitude data as desired by the musician.

18. The musical instrument as set forth in claim 1 further including clock means for generating clock signals at a predetermined, relatively high rate, and pitch generator means responsive to the pitch selected by the musician for supplying pitch information to the waveform determining means, the pitch information supplying means being connected to th clock means and having an output which is a function of both the selected pitch and of the clock signal rate.

19. The musical instrument as set forth in claim 18 wherein the first adder means is connected to the pitch generator means, said pitch generator means determining said first predetermined interval.

20. The musical instrument as set forth in claim 18 wherein the pitch generator means is a programmable counter, the output of the pitch generator means having a frequency which is the frequency of the output of the clock means divided by a number representing the pitch selected by the musician.

* * * * *